United States Patent
Bermel

(10) Patent No.: US 7,985,118 B2
(45) Date of Patent: Jul. 26, 2011

(54) DEVICE FOR SCRAPING DEBRIS FROM A HONEY SUPER

(75) Inventor: Larry A. Bermel, Java, SD (US)

(73) Assignee: Cook & Beals, Inc., Loop City, NE (US)

( * ) Notice: Subject to any disclaimer, the term of this patent is extended or adjusted under 35 U.S.C. 154(b) by 358 days.

(21) Appl. No.: 12/384,858

(22) Filed: Apr. 9, 2009

(65) Prior Publication Data

US 2010/0261409 A1 Oct. 14, 2010

(51) Int. Cl.
*A01K 51/00* (2006.01)
(52) U.S. Cl. ............................................. 449/56; 449/2
(58) Field of Classification Search ................ 449/2, 50, 449/56

See application file for complete search history.

(56) References Cited

U.S. PATENT DOCUMENTS

| | | | |
|---|---|---|---|
| 4,346,490 A * | 8/1982 | Katz et al. | 449/2 |
| 4,520,519 A | 6/1985 | Kuehl | |
| 4,763,572 A | 8/1988 | Kuehl | |
| 5,326,304 A * | 7/1994 | Horr | 449/50 |
| 5,685,762 A * | 11/1997 | Penrose et al. | 449/51 |
| 2007/0232189 A1 | 10/2007 | Hamby | |

* cited by examiner

*Primary Examiner* — Rob Swiatek
*Assistant Examiner* — Joshua Huson
(74) *Attorney, Agent, or Firm* — Dennis L. Thomte; Thomte Patent Law Office LLC

(57) ABSTRACT

A device for scraping debris from a honey super is provided which scrapes debris from the inside surfaces of a honey super and from the recesses at the upper ends of the front and back walls of a honey super.

7 Claims, 8 Drawing Sheets

DEVICE FOR SCRAPING DEBRIS FROM A HONEY SUPER

BACKGROUND OF THE INVENTION

1. Field of the Invention

This invention relates to a device for scraping debris from a honey super or box and more particularly to a mechanized device which scrapes debris from the inside surfaces of the end walls and side walls of the super as well as scraping debris from the frame supporting recesses formed in the upper inner ends of the end walls of the super.

2. Description of the Related Art

When the honey supers or honey boxes are removed from a beehive, the frames thereof are filled with honey. The frames are then removed from the supers, such as illustrated in U.S. Pat. No. 4,520,519 or by other means, to facilitate the honey extraction process. Left behind in the super is residual wax and miscellaneous other wax-related products commonly referred to as debris. These products must be removed from the inside surfaces of the walls of the super as well as from the frame supporting recesses formed in the upper inner ends of the end walls of the super so that the empty honey frames may be easily reinstalled into the super. The removal of the debris from the super is a time-consuming and monotonous task which was heretofore accomplished manually by the use of sharp hand tools. Accordingly, the person scraping the debris from the supers could be injured by coming into contact with the sharp hand tool. Further, some persons may develop carpel tunnel problems through the repeated scraping motions.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A devise is disclosed for scraping debris from a honey super having open upper and lower ends, a vertically disposed front wall, a vertically disposed back wall, a vertically first side wall, a vertically disposed second side wall, with the walls having inner and outer surfaces and with the inner surfaces of each of the front and back walls having an elongated, horizontally disposed recess formed therein at the upper end thereof which extends between the inner surfaces of the first and second side walls for supporting honey frames thereon.

The invention includes a frame means having a lower end, an upper end, a front side, a back side, a first side and a second side. A horizontally disposed and vertically movable super support is mounted on the frame means and includes a front end, a back end, a first side and a second side and which is adapted to have a super selectively removably positioned thereon so that the front wall of the super is positioned at the front end of the super support.

A power cylinder is operatively secured to the frame means and the super support for selectively moving the super support between a lower loading/unloading position to an upper position and vice versa. A first generally horizontally disposed scraping assembly is mounted on the frame means which is adapted to scrape debris from the inside wall surfaces of the super as the super is raised from its lower position to its upper position by the super support. A second generally horizontally disposed scraping assembly is selectively movably mounted on the frame means above the lower end thereof. The second scraping assembly is horizontally movable between first and second positions. The second scraping assembly includes first and second scrapers which protrude into the recesses at the upper inner surfaces of the front and back walls of the super when the super support is moved from its lower position to its upper position with a super thereon. The first and second scrapers are selectively movable between the ends of the respective recesses to scrape debris therefrom.

When the debris has been scraped from the super by the first and second scraping assemblies, the scraped super is lowered from its upper position to its unloading position and is then manually removed from the super support.

It is therefore a principal object of the invention to provide a device for scraping debris from a honey super.

A further object of the invention is to provide a device for mechanically scraping debris from a honey super.

A further object of the invention is to provide a device for scraping debris from the inside wall surfaces of the super as well from the recesses formed at the upper inner ends of the front and back walls of the super.

Yet another object of the invention is to provide a device for scraping debris from a honey super which eliminates the need for a person having to manually scrape debris from the super with a sharp hand tool.

A further object of the invention is to provide a device of the type described which prevents injury to workers who would normally use sharp hand tools to scrape debris from a honey super.

Still another object of the invention is to provide a device of the type described which eliminates the monotonous and repetitious scraping action required when a worker must manually remove debris from a super with a sharp hand tool.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
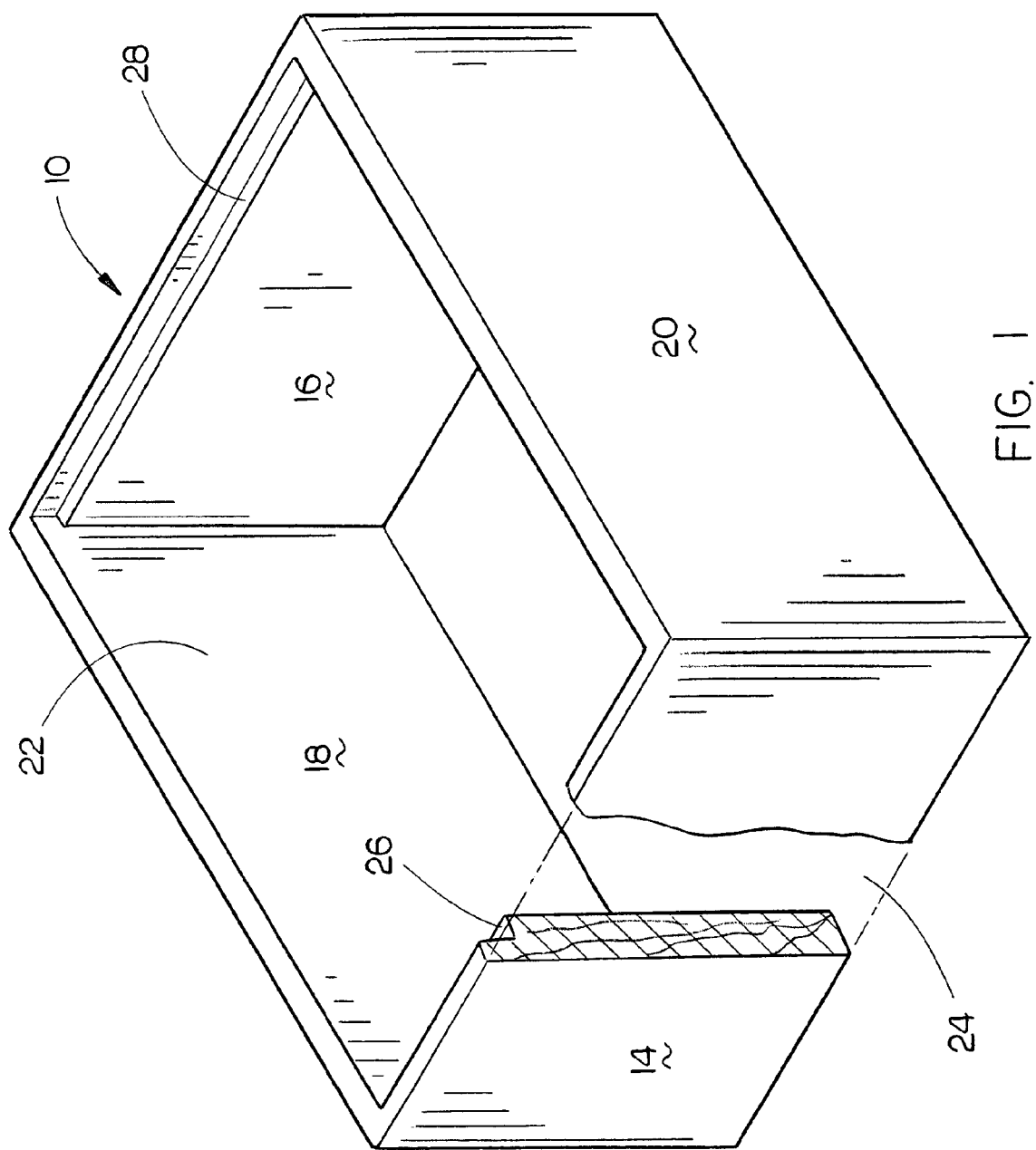
FIG. 1 is a perspective view of a honey super with a portion thereof cut-away to more fully illustrate the invention.
Figure 2:
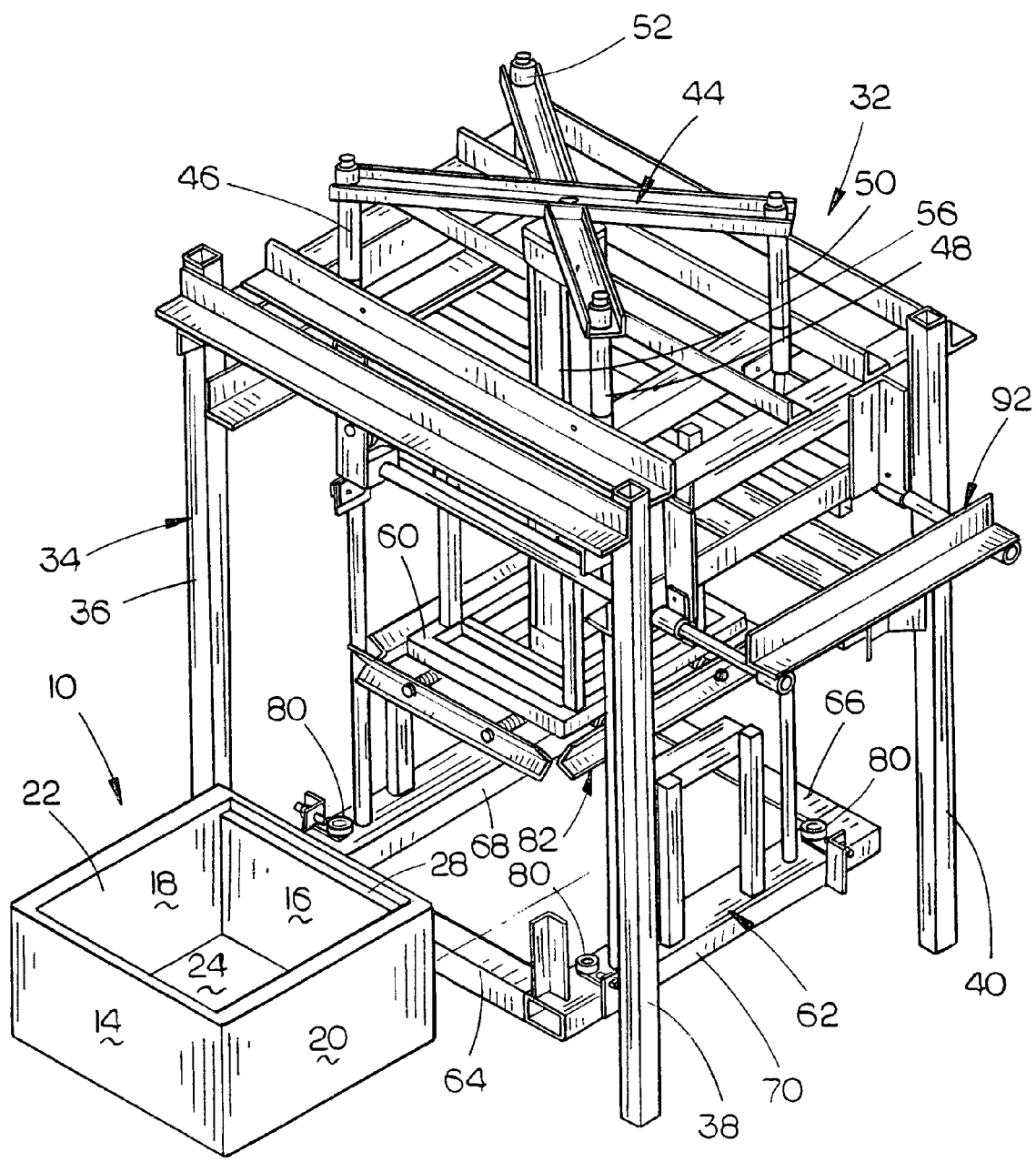
FIG. 2 is a front perspective view of the device of this invention which illustrates a honey super about to be positioned on the super support thereof.
Figure 3:
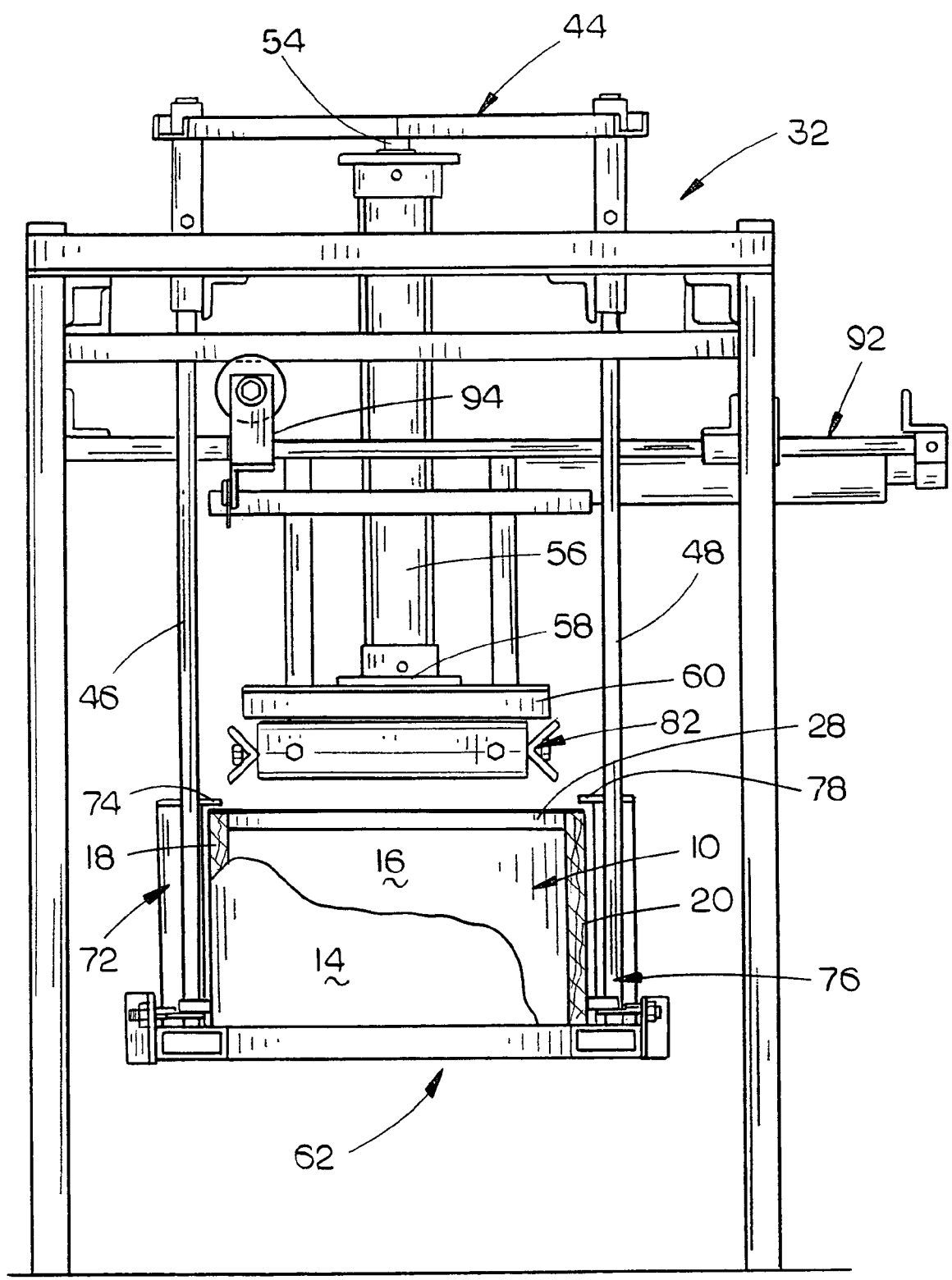
FIG. 3 is a front view of the device of FIG. 2 with the honey super positioned on the super support with the super support in its lowermost loading/unloading position.
Figure 4:
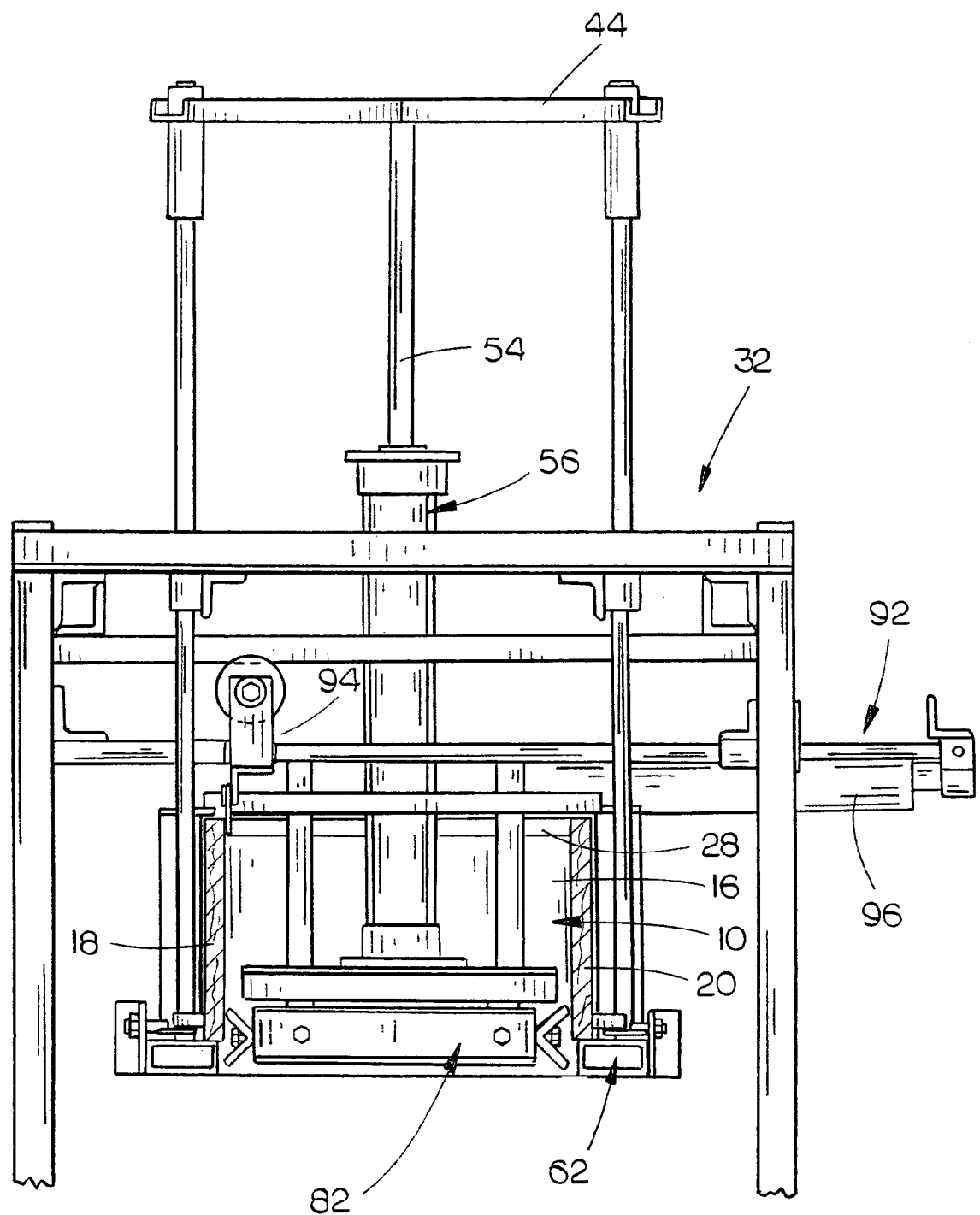
FIG. 4 is a partial front view of the device of this invention illustrating the super having been raised to its uppermost position.
Figure 5:
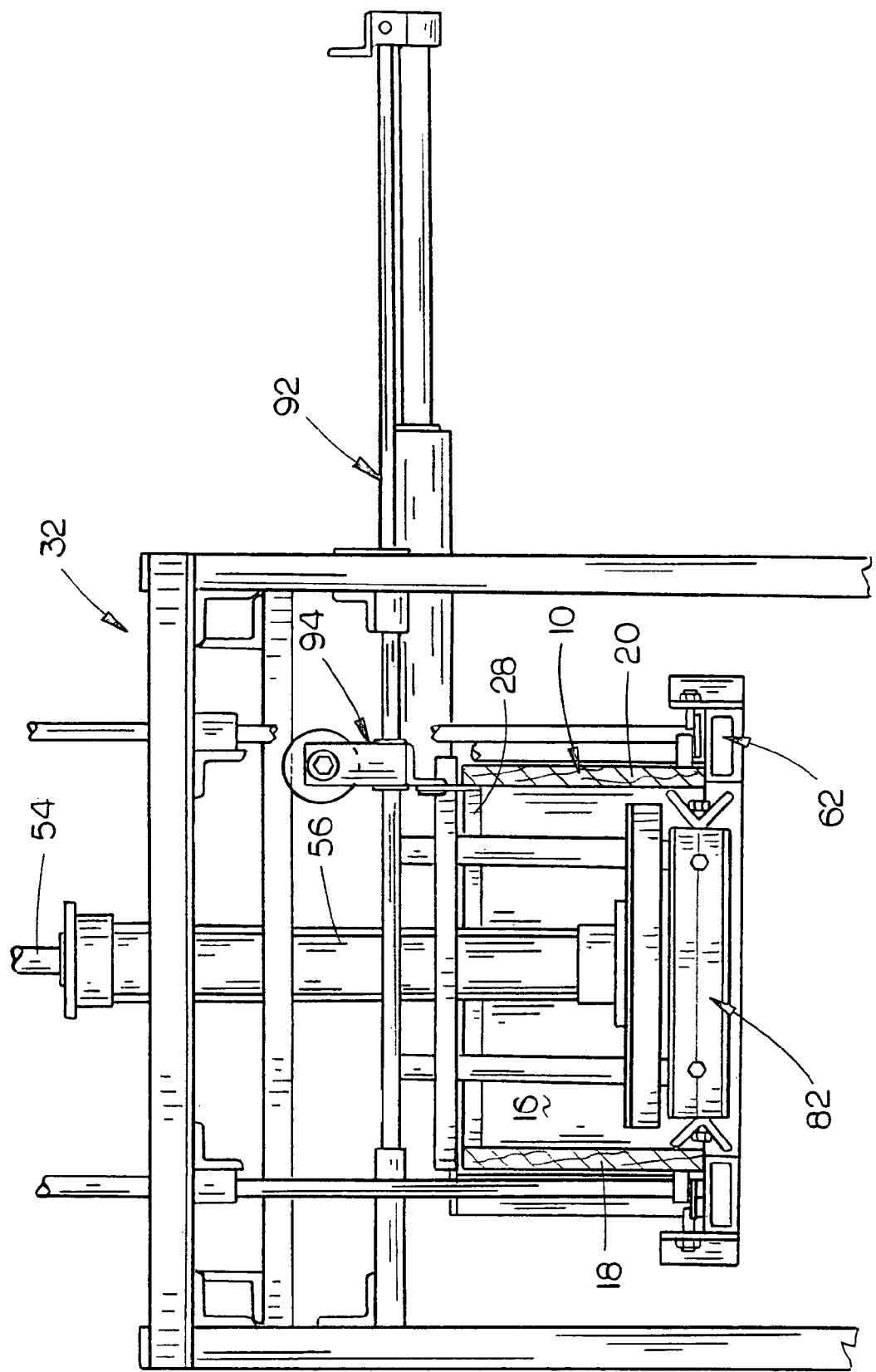
FIG. 5 is a view similar to FIG. 4 except that the second scraping assembly has been moved from the left to the right thereof to scrape debris from the recesses at the upper inner ends of the front and back walls of the super.
Figure 6:
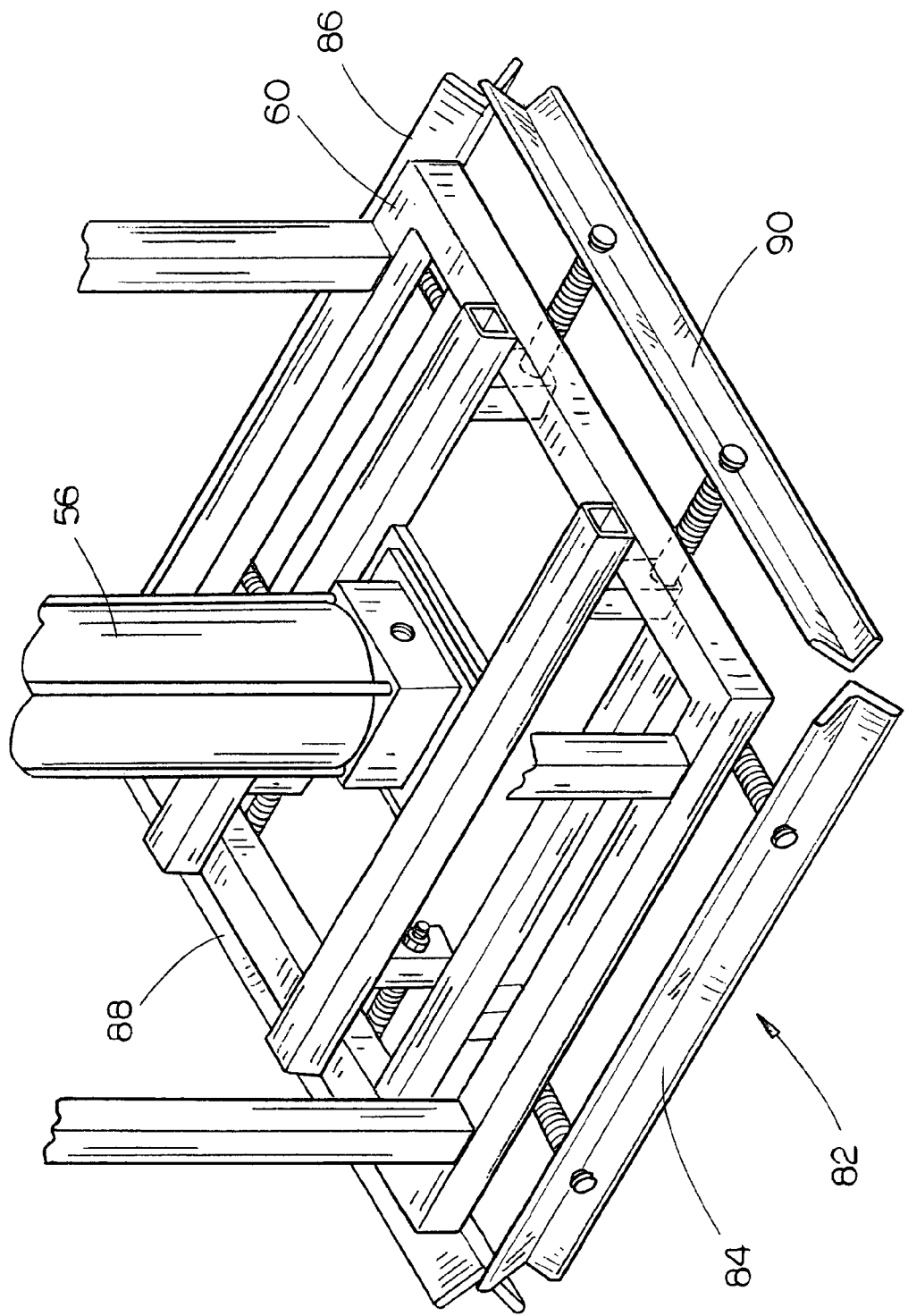
FIG. 6 is a partial perspective view of the device illustrating the first scraper assembly.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional honey super or box which is adapted to have conventional honey frames, not shown, positioned therein for placement in a bee hive. For purposes of description, super 10 will be described as it is placed in the device of this invention. Super 10 includes a vertically disposed front wall 14, a vertically disposed back wall 16, a vertically disposed side wall 18 and a vertically disposed side wall 20. The ends of the walls 14, 16, 18 and 20 are joined together by any convenient means so as to define the shape of the super 10 which has an open upper end 22 and an open lower end 24.

The upper inner end of front wall 14 has a recess or groove 26 formed therein which extends between the inside surfaces of side walls 18 and 20. The upper inner end of back wall 16 has a recess or groove 28 formed therein which extends between the inside surface of side walls 18 and 20. The ends of the honey frames, which are positioned in the super 10, normally rest upon the horizontal portions of the recesses 26 and 28 respectively in conventional fashion.

The device for removing debris 30 (FIG. 7) from the super 10 is referred to generally by the reference numeral 32 and generally includes a frame means 34 including at least 4 vertically disposed support legs 36, 38, 40 and 42 having upper and lower ends. A generally X-shaped support 44 is vertically movably mounted on the frame means 34 and is positioned centrally above the upper end thereof. Elongated connecting rods 46, 48, 50 and 52 have their upper ends secured to support 44 and extend downwardly therefrom. The cylinder rod of power cylinder 56, which may be air powered for hydraulically powered, has its base end 58 secured to a support 60, which is a part of frame means 34 and which is fixed in place. The extension of rod 54 from cylinder 56 causes support 44 to vertically move upwardly which also causes connecting rods 46, 48, 50 and 52 to vertically move upwardly relative to frame means 34. Retraction of cylinder rod 54 into cylinder 56 causes support 44 to vertically move downwardly which also causes connecting rods 46, 48, 50 and 52 to vertically move downwardly relative to frame means 34.

The numeral 62 refers to a super support having a front support member 64, a back support member 66, a first side support member 68 and a second side support member 70. The lower ends of connecting rods 46 and 52 are secured to first side support member 68 and the lower ends of connecting rods 48 and 50 are secured to second side support member 70 so that super support 62 moves vertically with connecting rods 46, 48, 50 and 52. A first super pull-down structure 72 is secured to support member 68 and extends upwardly therefrom and includes a horizontally disposed angle member 74 at its upper end. A second super pull-down structure 76 is secured to support member 70 and extends upwardly therefrom and includes a horizontally disposed angle member 78 at its upper end.

A plurality of super guide rollers 80 are mounted on super support 62 for guiding super 10 into its proper loaded position.

The numeral 82 refers to the first super scraping assembly which is fixed to the support 60 and which includes four angular scraper members 84, 86, 88 and 90 which are dimensioned so as to be received within the super 10 as will be described hereinafter.

A horizontally and transversely movable second scraper assembly 92 is mounted near the upper end of frame means 34 and includes a movable carriage 94 which is movable from a first position to a second position by a power cylinder 96. Carriage 94 includes a front scraper member 98 and a back scraper member 100 extending downwardly therefrom and movable therewith. Scraper members 98 and 100 are received by the recesses 26 and 28 of the super 10 as will be explained hereinafter.

Figure 7:
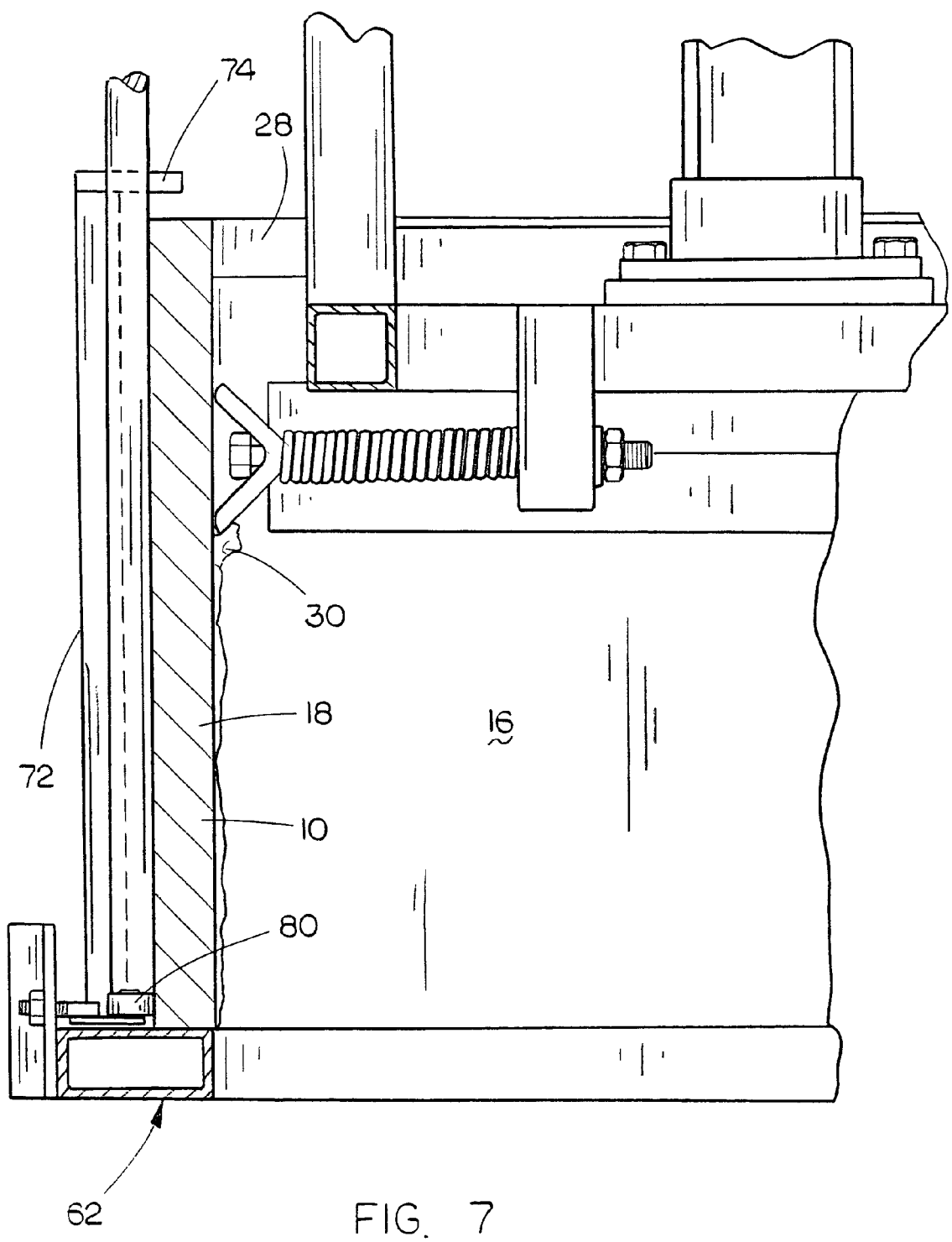
FIG. 7 is a partial front view of the first scraper assembly illustrating the manner in which the first scraper assembly scrapes debris from the inner wall surface of one of the walls of the super.
Figure 8:
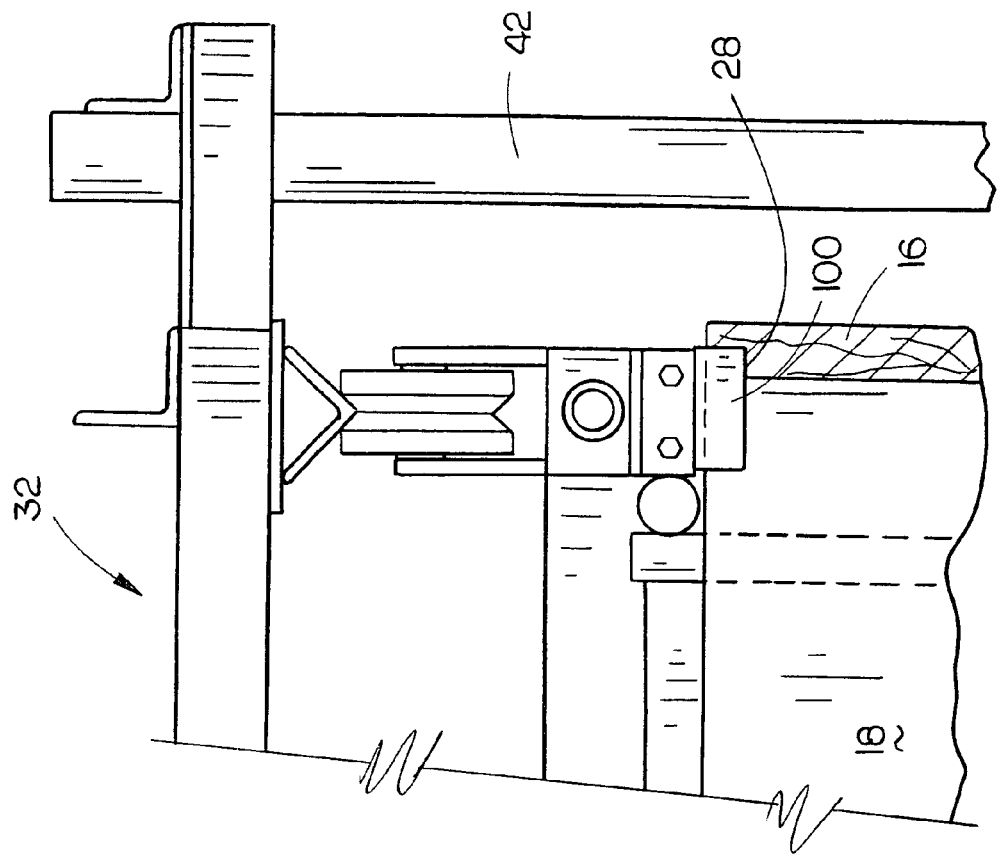
FIG. 8 is a partial side view of the device illustrating the two scraping members of the second scraper assembly being positioned in the recesses at the upper inner ends of the front and back walls of the super.
Figure 8:
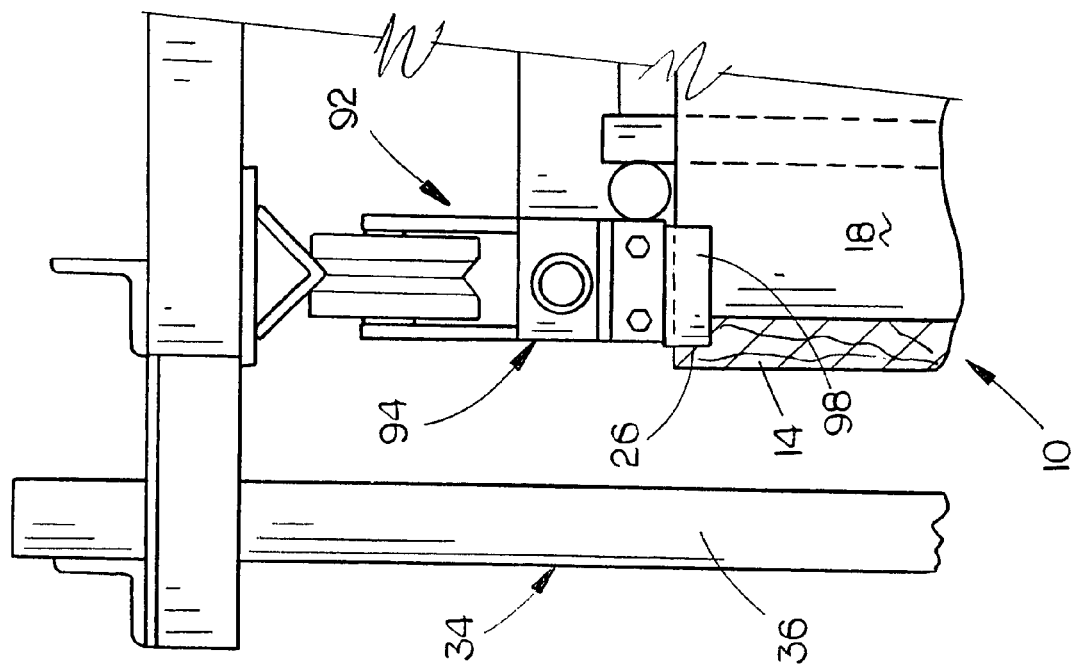

In use, the super support 62 will be in its lowermost super loading position. The super 10 is placed on the super support 62 with the guide rollers 80 facilitating the proper position of a super 10 with respect to the super support 62. Other stop means are also provided to limit the inward movement of the super 10 with respect to the super support 62. Once the super 10 has been placed on the super support 62, the hydraulic cylinder 56 is extended which causes super support 62 to be raised vertically upwardly from its lowermost position to its uppermost position. As the super support 62 is raised so that the angular scraper members 84, 86, 88 and 90 of the first super scraping assembly 82 will engage the debris on the inner surfaces of the walls 14, 16, 18 and 20 of the super 10 to scrape the debris 30 from the inner wall surfaces thereof as illustrated in FIG. 7. The debris scraped from the inside wall surfaces of the super will fall downwardly through the central opening of the frame means and will be collected in a suitable container such as a barrel, box, etc.

When the super support 62 has been raised to its uppermost position, the movable carriage 94 will be positioned in its first position by the power cylinder 96 with the front scraper member 98 and the back scraper member 100 extending downwardly therefrom so that the scraper members 98 and 100 are received by the recesses 26 and 28 of the super 10. The power cylinder 96 is then activated to cause the scraper members 98 and 100 to move from one end of the recesses 26 and 28 of the super 10 to the other ends of the recesses 26 and 28 so as to scrape debris from the recesses 26 and 28. When the scraper members 96 and 100 have been moved through the ends of the recesses 26 and 28, the power cylinder 96 is actuated to move the movable carriage back to its first position.

The cylinder 56 is then actuated so that the cylinder rod 54 is retracted to cause the support 44 to vertically move downwardly relative to the frame means 34 to its lowermost position. The pull-down structures 72 and 76 ensure that the super 10 will not hang up on the first scraper assembly 82 but will be moved completely down to the lowermost position with the super support 44.

The scraped super 10 is then removed from the super support 62 so that another super 10 having debris thereon may be scraped.

It can therefore be seen that a novel device has been provided for scraping debris from a honey super in an automatic fashion without the need of a worker to manually scrape debris from the inside surfaces of a super and from the recesses of the upper end of the front and back walls of the super.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A device for scraping debris from a honey super having upper and lower ends, a vertically disposed front wall, a vertically disposed back wall, a vertically disposed first side wall, a vertically disposed second side wall, the walls having inner and outer surfaces with the inner surfaces of each of the front and back wall having an elongated, horizontally disposed recess formed therein at the upper end thereof which extends between the inner surfaces of the first and second walls, comprising:
 a frame means having a lower end, an upper end, a front side, a back side, a first side and a second side;
 a horizontally disposed super support including a front end, a back end, a first side and a back side adapted to have a super selectively removably positioned thereon so that the front side of the super is positioned at the front end of said super support;
 a first power cylinder operatively secured to said frame means and said super support which selectively moves said super support between a lower loading/unloading position to an upper position and vice versa;
 a first generally horizontally disposed scraping assembly mounted on said frame which is adapted to scrape debris from the inside wall surfaces of the super as the super is raised from its said lower position to its said upper position by said first power cylinder;
 a second generally horizontally disposed scraping assembly selectively movably mounted on said frame means above said lower end thereof;
 said second scraping assembly being horizontally movable between first and second positions;
 said second scraping assembly including first and second scrapers which protrude into the recesses at the upper inner surfaces of the front and back walls of the super when said super support has moved from its said lower position to its said upper position with a super thereon;
 said first and second scrapers being selectively movable between the ends of the respective recesses to scrape debris therefrom.

2. The device of claim 1 wherein said first scraper assembly comprises first, second, third and fourth elongated scraper bars which are mounted on said frame means so as to define a quadrilateral shape corresponding to the shape of the inner surfaces of the walls of the super.

3. The device of claim 2 wherein each of said scraper bars have an angular cross-section.

4. The device of claim 1 wherein a power cylinder is operatively connected to said first and second scrapers for horizontally moving the same.

5. The method of removing debris from a honey super having upper and lower ends, a vertically disposed front wall, a vertically disposed back wall, a vertically disposed first side wall, a vertically disposed second side wall, the walls having inner and outer surfaces with the inner surfaces of each of the front and back wall having an elongated, horizontally disposed recess formed therein at the upper end thereof which extends between the inner surfaces of the first and second walls, comprising the steps of:
 placing the super on a vertically movable super support which is movable from a lower super loading/unloading position to an upper position;
 scraping debris from the inner surfaces of the side wall of the super as the super is moved upwardly by the super support as the super support is moved from its lower position to its upper position;
 scraping debris from the recesses at the upper inner surfaces of the front and back walls of the super while the super support is in its upper position; and
 moving the super support to its lower position so that the scraped super may be unloaded from the super support.

6. The method of claim 5 wherein debris is scraped from the super in an automatic mechanical fashion.

7. The method of claim 5 wherein debris is scraped from the inner surfaces of the walls of the super in an automatic mechanical fashion.

* * * * *